United States Patent
Stagakis

[19]

[11] Patent Number: 6,074,778
[45] Date of Patent: Jun. 13, 2000

[54] METHOD OF USING METAL CONDUCTIVE BLANKS FOR EXTENDING USEFUL BATTERY LIFE

[76] Inventor: George A. Stagakis, George's TV and Radio Repair, 1714A 41st St., North Bergen, N.J. 07047

[21] Appl. No.: 09/386,356

[22] Filed: Aug. 31, 1999

Related U.S. Application Data

[63] Continuation-in-part of application No. 09/174,563, Oct. 19, 1998, abandoned
[60] Provisional application No. 60/088,237, Jun. 5, 1998.

[51] Int. Cl.[7] .............................. H01M 2/10; F21L 7/00
[52] U.S. Cl. ............................ 429/99; 429/98; 429/100; 429/157; 362/202; 362/208
[58] Field of Search ................................ 429/7, 8, 9, 50, 429/52, 96–100, 123, 149, 156, 157; 362/194, 196, 202, 203, 204, 208

[56] References Cited

U.S. PATENT DOCUMENTS

| | | |
|---|---|---|
| 1,464,573 | 8/1923 | Heise et al. . |
| 2,886,623 | 5/1959 | Lehr . |
| 2,938,111 | 5/1960 | Keilman . |
| 3,070,748 | 12/1962 | Worobey et al. . |
| 3,201,742 | 8/1965 | English . |
| 3,486,944 | 12/1969 | O'Donnell . |
| 4,333,129 | 6/1982 | Ewing ...................................... 362/205 |
| 4,962,347 | 10/1990 | Burroughs et al. .................. 340/636 X |
| 5,051,157 | 9/1991 | O'Brien et al. ....................... 204/129.1 |
| 5,197,796 | 3/1993 | Moore .................................... 362/202 |
| 5,277,993 | 1/1994 | Landers ..................................... 429/10 |
| 5,418,433 | 5/1995 | Nilssen .................................... 315/175 |
| 5,593,222 | 1/1997 | Maglica .................................. 362/157 |
| 5,603,782 | 2/1997 | Sugikawa et al. ...................... 148/518 |

FOREIGN PATENT DOCUMENTS 59-226463  12/1984  Japan .

*Primary Examiner*—Maria Nuzzolillo
*Assistant Examiner*—Jonathan Crepeau
*Attorney, Agent, or Firm*—Richard C. Litman

[57] ABSTRACT

A method of extending the useful life of one or more conventional DC batteries in a battery-powered device. The method involves use of at least one dry cell DC battery, at least one metal blank, and a battery-powered apparatus having a battery compartment and an extension housing. At least one dry cell DC battery is placed inside the battery compartment of the battery-powered apparatus. At least one metal blank is then placed in the extension housing for completing an electrical circuit between first and second contacts of the battery-powered device. Using a voltmeter, the voltage of one of the dry cell DC batteries is tested. If the voltage of the dry cell DC battery is below a threshold voltage level required for the battery-powered apparatus, at least one metal blank is then replaced with a partially-charged battery.

4 Claims, 4 Drawing Sheets

METHOD OF USING METAL CONDUCTIVE BLANKS FOR EXTENDING USEFUL BATTERY LIFE

CROSS REFERENCE TO RELATED APPLICATION

This application is a continuation-in-part of application Ser. No. 09/174,563 filed Oct. 19, 1998, now abandoned, which claims the benefit of U.S. Provisional Patent Application Ser. No. 60/088,237, filed Jun. 5, 1998.

BACKGROUND OF THE INVENTION

1. Field of the Invention

The present invention relates generally to DC batteries and, more particularly, to a method of using partially charged DC batteries in conjunction with metal blanks to extend the useful life of batteries used by a battery-powered apparatus.

2. Description of Related Art

Commonly, many devices such as portable radios, flashlights, or toys use DC batteries as power sources. A common problem has existed since the advent of these batteries in that dry cell batteries have a limited operating life span and are usually not rechargeable. Once the energy in a conventional DC battery has been expended below a predetermined voltage level, its usefulness ceases and the battery must be discarded and replaced.

Research continues to be conducted to develop batteries with extended life spans. This research has led to the relatively recent development of the alkaline battery. However this battery will also eventually lose its energy and cease to operate. Therefore, problems associated with the use of conventional DC dry cell batteries still exist. In particular, battery-powered devices will not operate once the voltage of a battery power source falls below a predetermined, threshold voltage level required for a particular battery-powered device.

Therefore a need still exists for a device which may extend the life of a DC battery used as a power source. Further, a need exists to reduce energy waste caused by discarded DC batteries in a weakened energy state with residual DC energy. A discussion of related art follows.

U.S. Pat. No. 5,277,993, issued Jan. 11, 1994 describes a device which is capable of replacing one or more of a plurality of DC batteries used as a power source and capable of extending the life of the batteries used. However, this invention does not disclose a method by which batteries may be used in a weakened state.

U.S. Pat. No. 3,201,742, issued Aug. 17, 1965, describes an electric connector device for replacing an exhausted dry cell battery with a "power pack." According to the described invention, battery cells are replaced by an improved connector and any remaining battery spaces are filled in by dummy batteries. Although this patent discloses the use of dummy cells for providing connectivity, this patent does not disclose replacing these dummy cells with weakened batteries to extend the useful life of a battery. Instead U.S. Pat. No. 3,201,742 discloses use of a combination transformer and rectifier connected to a conventional electric outlet to provide a power source.

Other patents of note include, U.S. Pat. No. 1,464,573, issued Aug. 14, 1923 to Heise et al.; U.S. Pat. No. 2,886,623, issued May 12, 1959 to Lehr; U.S. Pat. No. 2,938,111, issued May 24, 1960 to Keilman; U.S. Pat. No. 3,486,944, issued Dec. 30, 1969 to O'Donnell; U.S. Pat. No. 4,962,347, issued Oct. 9, 1990 to Burroughs et al.; and U.S. Pat. No. 5,197,796, issued Mar. 30, 1993 to Moore; all show battery operated devices capable of holding or using temporary battery substitutions.

None of the above inventions and patents, taken either singly or in combination, is seen to describe the instant invention as claimed.

SUMMARY OF THE INVENTION

The invention is a method of extending the useful life of one or more conventional DC batteries in a battery-powered device. A typical battery when 'new' has a voltage value or rating for the size of the battery. Typically most standard, non-specialty, dry cell batteries are rated at 1.5 volts. Another standard, non-specialty type battery is the 9.0 volt rated battery commonly used in transistor radios, etc. A weakened dry cell battery is generally a battery that has dropped within the range of approximately 73% to 100% of its initial voltage rating. For example, a standard, non-specialty AA battery whose voltage is rated at 1.5 volts is deemed weakened when it voltage is between approximately 1.1 volts and 1.5 volts. Likewise, a weak battery has a voltage that has dropped between approximately 73% of its initial voltage rating and 0 volts. A voltage rating of a dry cell battery which has fallen to 0 volts is considered a dead battery. Using the same AA battery as the example, between 1.1 volts and 0 volts, it is a weak battery; at 0 volts, it is a dead battery.

The method of the present invention involves use of dry cell DC batteries, metal blanks, and a battery-powered apparatus having a battery compartment. Dry cell DC batteries are placed inside the battery compartment of the battery-powered apparatus. A metal blank is then also placed in the battery compartment for providing an electrical contact between the dry cell DC batteries and the battery compartment. Using a voltmeter, the voltage of the dry cell DC batteries is tested. If the voltage of the dry cell DC batteries is below a predetermined, threshold voltage level required for the battery-powered apparatus, a metal blank is then replaced with a weak battery.

Accordingly, it is a principal object of the invention to extend the life of conventional DC batteries.

It is another object of the invention to reduce energy waste caused by discarding DC batteries possessing residual energy in a weakened energy state.

It is a further object of the invention to reduce energy costs for devices powered by DC batteries.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
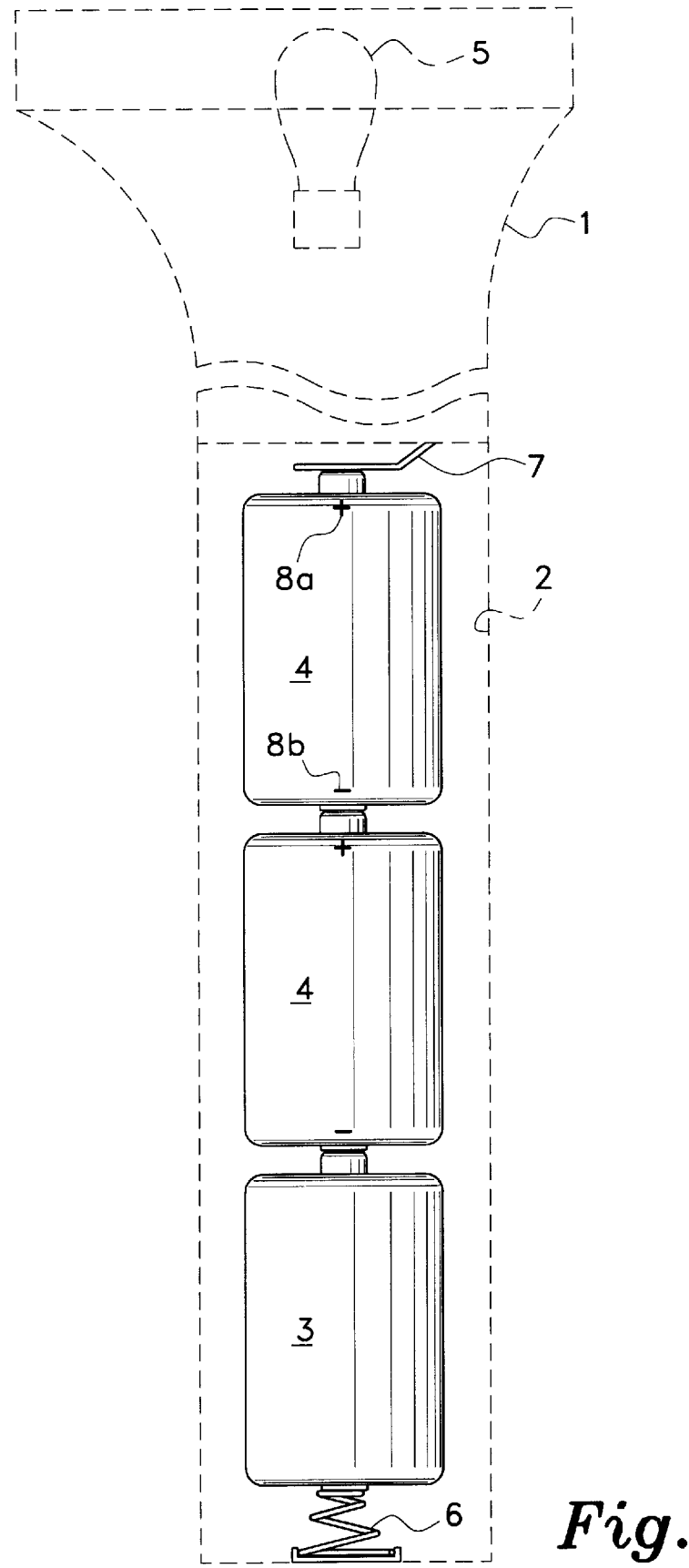
FIG. 1 is an elevational view of a first state of an embodiment of the invention, showing a flashlight in ghost lines and a battery compartment containing a plurality of dry cell DC batteries and a metal blank.
Figure 2:
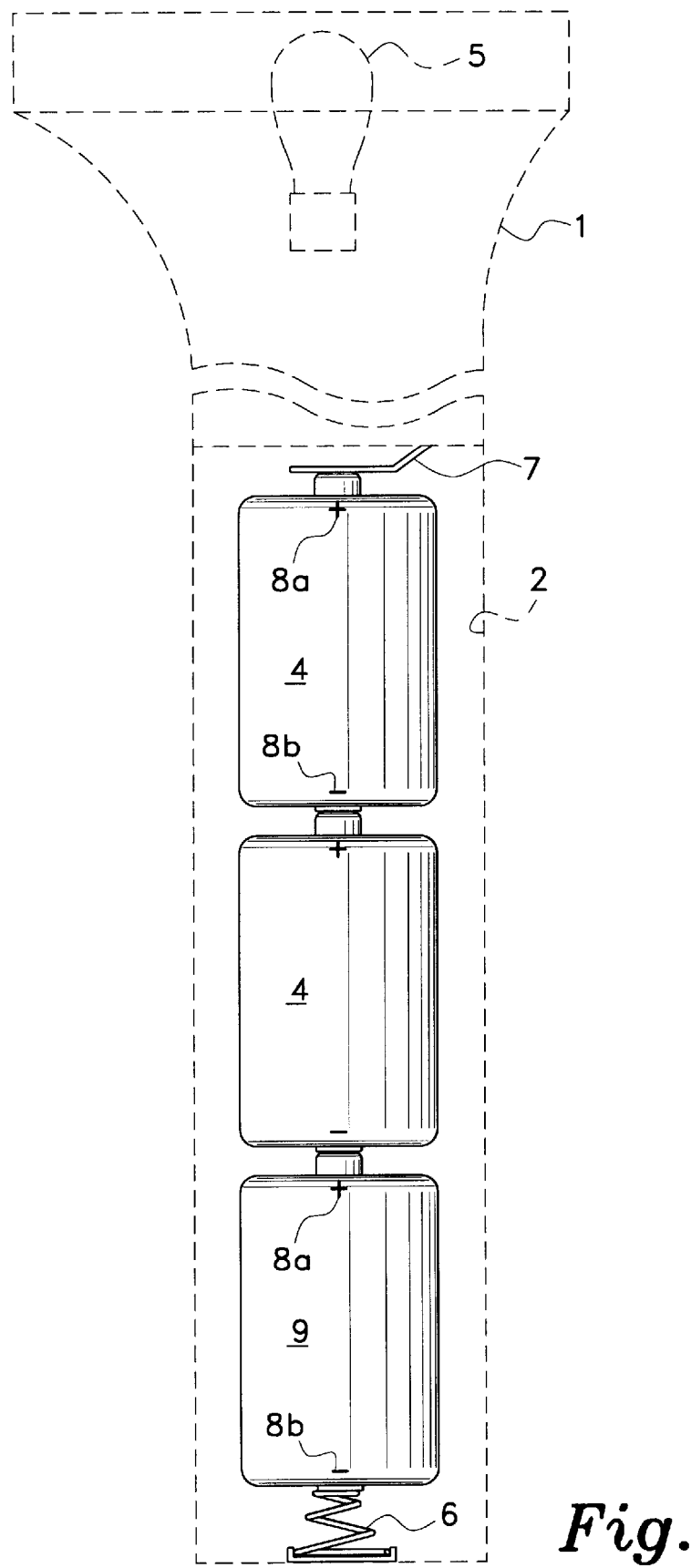
FIG. 2 is an elevational view of a second state of the embodiment of FIG. 1, showing a weakened battery replacing the metal blank.
Figure 4:
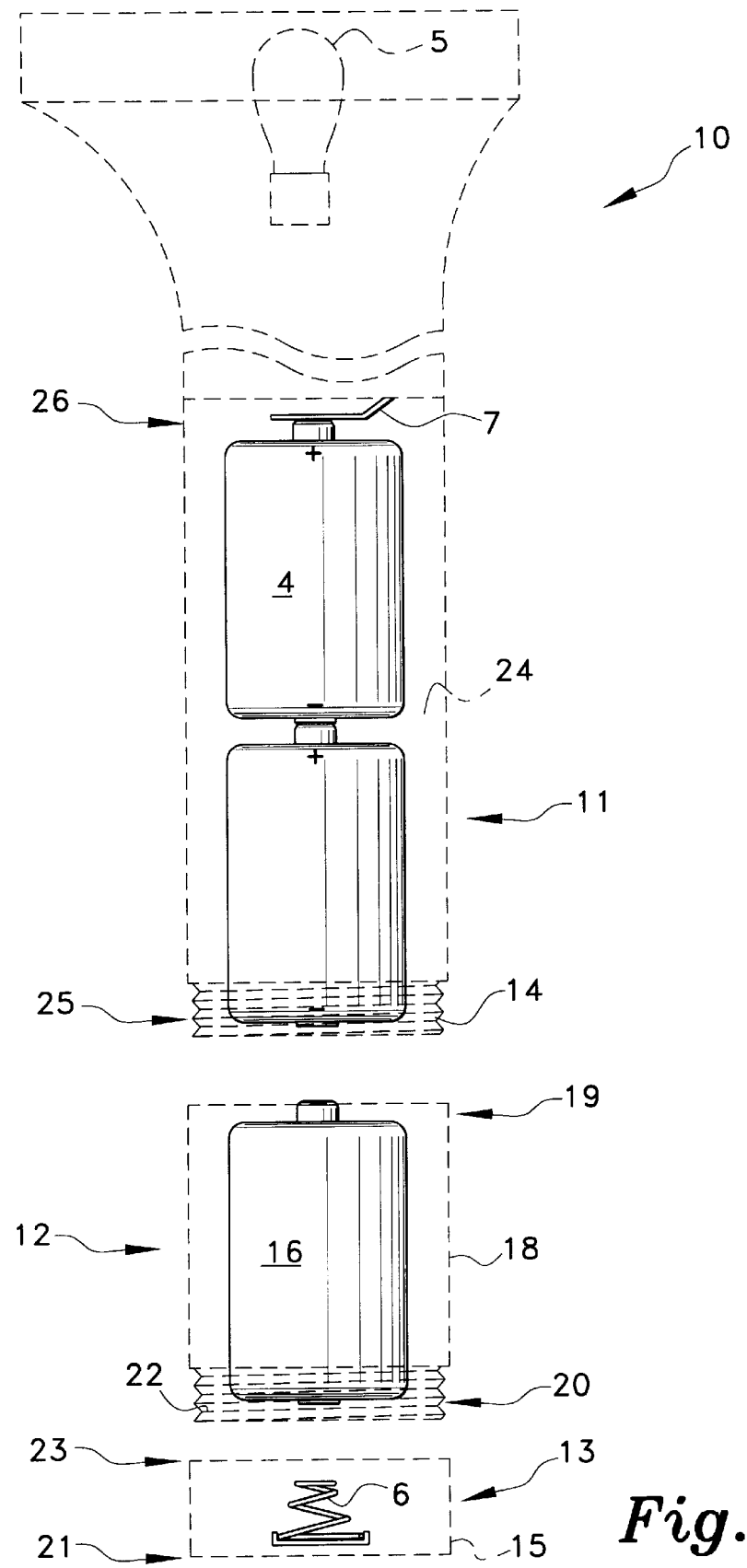
FIG. 4 is an elevational view of an apparatus of the invention having an individual battery compartment for housing a weakened battery for use with a conventional, threaded battery housing.

The present invention relates to a method for extending the useful life of dry cell DC batteries used in battery-powered devices. Since many devices are powered by dry cell DC batteries, it should be understood that the method of the present invention is capable of being used on virtually all types of battery-powered devices, it is not restricted to the flashlight as illustrated in the figures. By way of illustration of the invention, a typical battery-operated device, such as a flashlight, is shown in FIGS. 1, 2, and 4. FIGS. 1 and 2 depict a conventional battery-powered flashlight housing 1 for implementing the method of the invention, whereas FIG. 4 depicts an apparatus for implementing the method, namely, an alternate flashlight housing 10 with at least one threaded extension sleeve 12.

Referring to FIG. 1, a conventional battery-powered flashlight housing 1 is shown. The flashlight housing 1 for implementing the present invention contains a battery compartment 2, a metal blank 3, at least one dry cell DC battery 4, a flat metal contact 7, a spring contact 6, and a light bulb 5. Since many devices are powered by dry cell DC batteries, it should be understood that the method of the present invention is capable of being used on virtually all types of battery-powered devices, it is not restricted to the flashlight illustrated in the figures.

The conventional battery-powered flashlight housing includes a battery compartment sized for holding a plurality of dry cell DC batteries 4. For example, FIG. 2 illustrates a battery compartment 2 sized for holding three dry cell DC batteries 4. However, it is to be understood that battery compartments of various sizes may be used with this invention without departing from the spirit of the invention and the scope of the claims presented herewith.

Battery compartment 2 contains a flat metal contact 7 and a spring contact 6. Both the flat metal contact 7 and the spring contact 6 are attached to an inside surface of the battery compartment 2. Conventional DC batteries are typically positioned in a manner to ensure proper electrical connection is made. That is, a positive polarity end 8a of battery 4 is positioned against the flat metal contact 7 and negative polarity end 8b of battery 2 is positioned against the spring contact 6. This positioning, as is well known in the art, permits proper for an electrical contact to be made to power a battery-powered apparatus.

Although the battery compartment 2 is identical to the prior art battery compartment described above, the method dictates that one or more conventional DC batteries be replaced with a metal blank 3 as shown in FIG. 1. The metal blank 3 is sized identically to conventional batteries 4 to form an electrical contact between a dry cell DC battery and a metal contact or spring contact located in the battery compartment.

According to the method the present invention, the first step involves placing at least one dry cell DC battery 4 in the battery compartment of a battery-powered apparatus, as shown in FIG. 1. The at least one dry cell DC battery 4 should placed in the battery compartment 2 in a conventional manner for forming an electrical contact with the metal contact 7. The required quantity of dry cell DC batteries 4 will depend on the voltage level needed for powering the battery-powered apparatus.

The second step of the invention involves, as illustrated in FIG. 1, involves positioning at least one metal blank 3 in the battery compartment 2 to form an electrical contact with the at least one dry cell DC battery placed on one side of the at least one metal blank 3 and a spring contact 6 situated on an opposing side of the at least one metal blank 3.

FIG. 2 illustrates the same embodiment implementing a third step of the invention. The third step of the invention involves replacing the at least one metal blank 3 with at least one weak battery 9 when the voltage of the at least one dry cell DC battery falls below a predetermined voltage level required for operating the flashlight. This condition may be recognized, for example, when the light bulb 5 starts to dim or when the flashlight 1 simply fails to operate. By replacing at least one metal blank 3 with at least one weak battery 9, the cumulative voltage of the batteries available for powering the flashlight may be increased by the amount of residual voltage remaining in the at least one weak battery 9. The number of weak batteries used to replace the at least one metal blank 3 may vary up to the number of metal blanks actually positioned in the battery compartment, depending on how much additional DC power is needed to properly operate the flashlight or other appliance.

Figure 3:
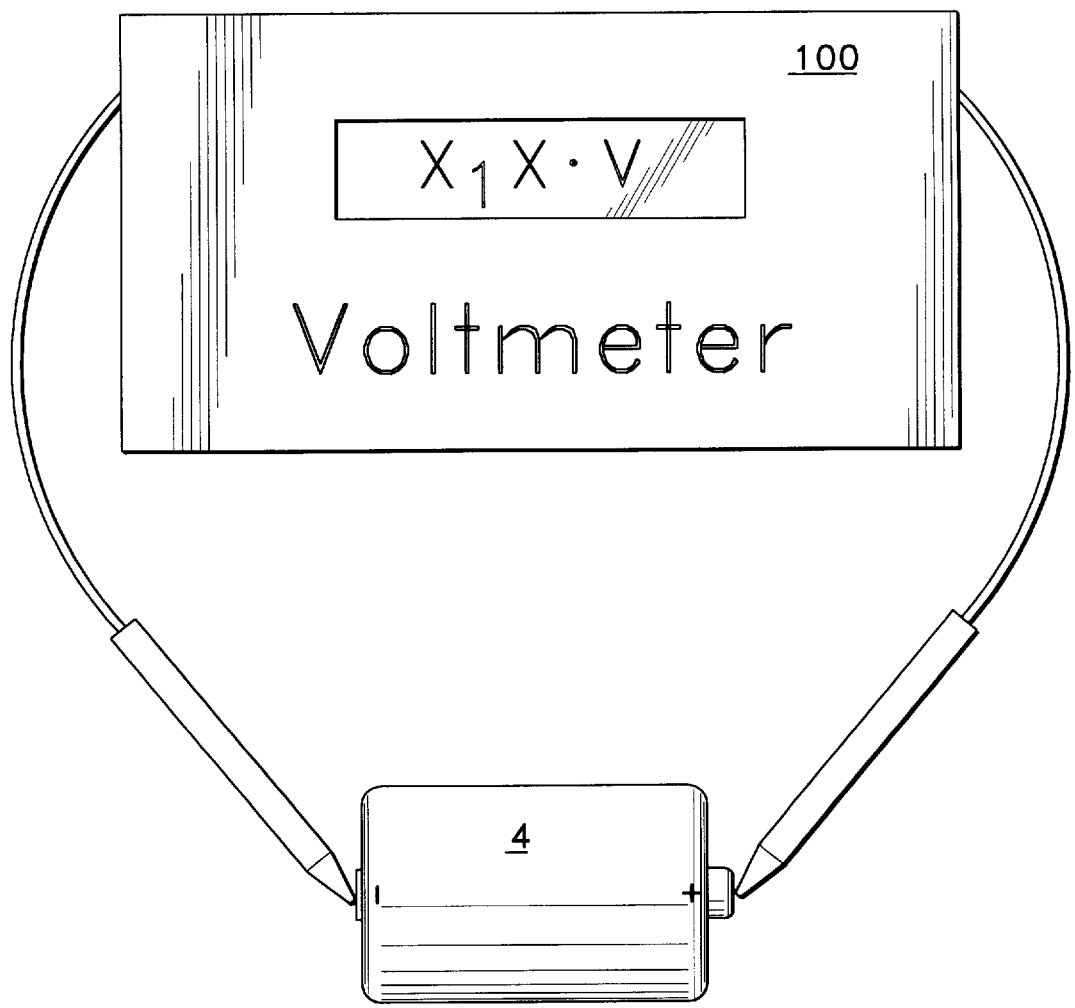
FIG. 3 is a diagrammatic representation of a step of the present invention showing use of a voltmeter to measure the voltage of a dry cell DC battery.

FIG. 3 illustrates an alternative step that may be added to the method of the present invention. FIG. 3 illustrates a voltmeter 100 being used to measure the voltage of a dry cell DC battery 4. The alternative step involves measuring the voltage of at least one of the dry cell DC batteries 4 before replacing at least one metal blank 3 with at least one weak battery 9. This step would enable one to assess more definitively, the amount of additional voltage needed to adequately power the battery-powered apparatus. FIG. 3 illustrates use of a voltmeter 100 for measuring the voltage of a dry cell battery 4.

FIG. 4 shows an alternative battery-powered flashlight housing 10 for implementing the method of the invention. The alternative flashlight housing 10 is defined by a conventional main battery housing 11 formed for housing at least one dry cell DC battery 4, an extension sleeve 12 for housing at least one additional dry cell DC battery 16, a conventional end cap 13 having a spring contact 6 formed therein, and a light bulb 5 contained in the flashlight housing 10. Formed inside of the flashlight housing 10 is a battery compartment 24 for housing conventional dry cell DC batteries. Formed around cap end 25 of the main battery housing 11 are conventional male threads 14 for threadedly connecting the main battery housing 11 to the end cap or another housing. Formed in an opposing end 26 of the main battery housing 11 is a metal contact 7.

The end cap 13 is defined by a cylindrical body 15 having conventional female threads formed at one end 23 thereof for threadedly connecting the end cap 13 to the main battery housing. The end cap 13 is further defined by a spring contact 6 formed in an opposing end 21 thereof for forming an electrical contact to permit free flow of electricity between dry cell batteries 4 and the battery-powered flashlight housing 11.

The extension sleeve 12 is defined by a cylindrical body 18 having conventional female threads formed around one end 19 thereof for threadedly connecting the extension sleeve 12 to the main battery housing 11. Formed around an opposing end 20 of the cylindrical body 18 are conventional male threads 22 for threadedly connecting the extension sleeve 12 to the end cap 13.

In use, the first step involves placing at least one dry cell DC battery 4 in the battery compartment 24 and threadedly fastening the end cap 13 onto the main battery housing 11 behind the battery 4 for supplying DC electrical power to the battery-powered flashlight housing 10. The required quantity of dry cell DC batteries 4 will depend on the structural configuration of the battery-powered apparatus.

The second step involves threadedly removing the end cap 13 from the main battery housing 11 when the available power of the at least one dry cell DC battery 4 falls below a predetermined minimum voltage level required to effectively operate the battery-powered apparatus. Thereafter, at least one extension sleeve 12 is threadedly attached to the main battery housing 11 to increase the storage capacity of the main battery housing 11. The present invention anticipates using as many extension sleeves 12 as needed to accommodate a sufficient number of dry cell DC batteries to effectively operate the battery-powered apparatus.

The third step is to place at least one additional dry cell DC battery 4 having residual electrical power into the extension sleeve 12 and then threadedly attach the end cap 13 thereto for increasing the available DC power provided by the dry cell DC batteries 4.

Conversely, the method involves the use of the extension sleeve 12 in the following manner. By attaching the extension sleeve 12 to the housing 11 initially, the battery compartment size is increased by the number of extension sleeves used (one being shown for the illustration). Internally, a conductive blank 3 may be placed into the extension sleeve 12 so as to make the necessary electrical connections. When the batteries fall into the weak voltage rating range, below 1.1 volts by example, the conductive blank 3 is removed and replaced with a battery 4 that has been recharged according to the method, so that its voltage is in the weakened voltage range.

The method for extending a useful life of batteries is used in a battery-powered device. The battery-powered device typically includes a main battery housing 11, an extension sleeve 12, and an end cap. Disposed within the battery housing 11 are at least one dry cell DC battery 4, at least one conductive blank 3, a first contact, a second contact, and at least one voltage consuming load. An electrical circuit couples the first and the second contacts, the at least one dry cell DC battery 4 and the at least one conductive blank 3, and the voltage consuming load. The method involves the step of periodically measuring the voltage of the dry cell DC battery 4, and removing the at least one conductive blank 3 in the extension sleeve 12 when the voltage of the at least one dry cell DC battery 4 falls below a threshold voltage level for operation of the battery-powered device.

Conventionally, for example, dry cell batteries have standard voltage ratings, for example, a "AA" standard dry cell battery 4 has a 1.5 voltage rating. Thus, the operational threshold voltage for this battery 4 is typically at or above 1.1 volts. Between 1.1 volts and its initial 1.5 volts, it is a weakened battery 4. The method also includes the step of placing a partially charged battery 4 in the extension sleeve 12 for increasing the available voltage to the battery-powered device. It is well known that recharging batteries results in an available battery 4 voltage less than standard voltage rating. That is, recharging a "AA" battery 4 optimally results in an available voltage of approximately 1.3 volts. This voltage is significantly below the 1.5 voltage rating, yet ample enough to overcome most operational threshold voltage requirements (at or about 1.1 volts, for example).

It is noted that although the method of the invention has been discussed using a flashlight as the battery-operated device, it is understood that the method of the present invention is capable of being used on virtually all types of battery-powered devices. Likewise, it is noted that although the battery compartment is discussed as cylindrical and likewise, the extension sleeve 12 is discussed as being cylindrical, yet it is to be understood that battery compartments of various sizes, shapes and configurations may be used with this invention without departing from the spirit of the invention and the scope of the claims presented herewith.

It is to be understood that the present invention is not limited to the embodiments described above, but encompasses any and all embodiments within the scope of the following claims.

I claim:

1. A method for extending a useful life of batteries used in a battery-powered apparatus, wherein the apparatus includes a main battery housing, an extension housing, at least one dry cell DC battery, at least one conductive blank, a first contact, a second contact, and at least one voltage consuming load electrically coupled between the first and the second contact, wherein the at least one dry cell DC battery and the at least one conductive blank complete an electrical circuit between the first and the second contact, the method comprising the steps of:

placing at least one dry cell DC battery in the main battery housing of the battery-powered device;

placing the least one conductive blank in the extension housing;

forming an electrical connection with the at least one dry cell DC battery in the main battery housing and the at least one conductive blank in the extension housing;

periodically measuring the voltage of each at least one dry cell DC battery;

removing the at least one conductive blank in the extension housing when the voltage of the at least one dry cell DC battery falls below a threshold voltage level for operation of the battery-powered device, and placing at least one partially charged battery in the extension housing for increasing the available voltage to the battery-powered device.

2. The method according to claim 1, wherein the step of periodically measuring the voltage of each at least one dry cell DC battery includes the steps of:

electrically coupling the at least one DC battery to a meter;

determining the voltage of the at least one DC battery; and comparing the voltage to the threshold voltage level for operation of the battery-powered apparatus.

3. A method for extending a useful life of batteries used in a battery-powered flashlight housing, the flashlight housing including a battery compartment, an extension sleeve, an end cap, at least one dry cell DC battery, at least one metal blank, a first electrical contact, a second electrical contact, and a lighting source electrically connected to the first and the second electrical contact, the method comprising the steps of:

joining the battery compartment with the extension sleeve;

placing the at least one dry cell DC battery in the battery compartment;

positioning the at least one metal blank in the extension sleeve;

forming an electrical circuit between the first and the second electrical contacts with the at least one dry cell DC battery, the at least one metal blank, the battery compartment, the extension sleeve, and the end cap;

providing at least one partially charged battery; and replacing the at least one metal blank in the extension sleeve with the at least one partially charged battery when the voltage of the at least one dry cell DC battery falls below an operational voltage threshold for the battery-powered flashlight;

whereby the at least one partially charged battery provides an increased voltage for raising the available voltage above the operational voltage threshold of the battery-powered flashlight.

4. The method for extending a useful life of batteries as defined in claim 3, wherein the method further comprises the step of measuring the voltage of the at least one dry cell DC battery before replacing the at least one metal blank in the battery compartment with the at least one partially charged battery.

* * * * *